United States Patent
Di Bernardo et al.

[11] Patent Number: 6,151,870
[45] Date of Patent: Nov. 28, 2000

[54] MACHINE FOR PACKAGING PRODUCTS USING A PLASTIC FILM COMPRISING A SAFETY SYSTEM AGAINST WORK ACCIDENTS

[75] Inventors: Pietro Di Bernardo, Mazzo Di Rho; Ugo Roberto Montani, Cornaredo, both of Italy

[73] Assignee: Interdibipack S.p.A., Milan, Italy

[21] Appl. No.: 09/274,682

[22] Filed: Mar. 24, 1999

[30] Foreign Application Priority Data

Mar. 27, 1998 [IT] Italy ................................. MI98A0644

[51] Int. Cl.[7] .............................. B65B 11/52; B65B 57/00
[52] U.S. Cl. ................................ 53/509; 53/77; 53/374.9; 53/371.9; 156/352; 156/365; 156/366; 156/368
[58] Field of Search ................................ 53/77, 509, 568, 53/371.9, 374.9; 156/583.8, 583.9, 352, 365, 366, 368

[56] References Cited

U.S. PATENT DOCUMENTS

| | | | |
|---|---|---|---|
| 3,645,066 | 2/1972 | Drygulski | 53/509 |
| 4,064,676 | 12/1977 | King et al. | 53/77 |
| 4,338,769 | 7/1982 | Jones | 53/509 |
| 4,400,612 | 8/1983 | Lee | 53/509 |
| 4,413,172 | 11/1983 | Jones | 53/509 |
| 4,480,421 | 11/1984 | Rece | 53/77 |
| 4,513,560 | 4/1985 | Hollingsworth | 53/509 |
| 4,650,535 | 3/1987 | Bennett et al. | |
| 4,955,185 | 9/1990 | Haas et al. | 53/77 |
| 5,381,640 | 1/1995 | Chiu | |
| 5,474,633 | 12/1995 | Myers | |
| 5,853,510 | 12/1998 | Lawson | 156/366 |
| 5,853,524 | 12/1998 | Nix | 156/366 |

FOREIGN PATENT DOCUMENTS

| | | |
|---|---|---|
| 0626314A1 | 11/1994 | European Pat. Off. |
| WO9208613 | 5/1992 | WIPO |

*Primary Examiner*—Brian L. Johnson
*Assistant Examiner*—Matthew Luby
*Attorney, Agent, or Firm*—Hedman, Gibson & Constigan, P.C.

[57] ABSTRACT

A machine for packaging products using a plastic film comprises: at least a fixed frame (TF) and at least a mobile counter-frame (CM), said counter-frame (CM) can be moved between a lifted rest position and a lowered working position wherein the film is clamped against said frame (TF), the movement of the mobile counter-frame (CM) is controlled by at least a fluid-dynamic actuator (25) which works between the machine frame (11) and said mobile counter-frame. According to the invention, a link (26) is positioned between said actuator (25) and said frame (11), said link is pivoted to the actuator (21) in (27) and is pivoted to the frame (11) in (28), said link (26) is further provided with a control device (30) connected to a sensor (32), in order to automatically stop the machine from working.

5 Claims, 4 Drawing Sheets

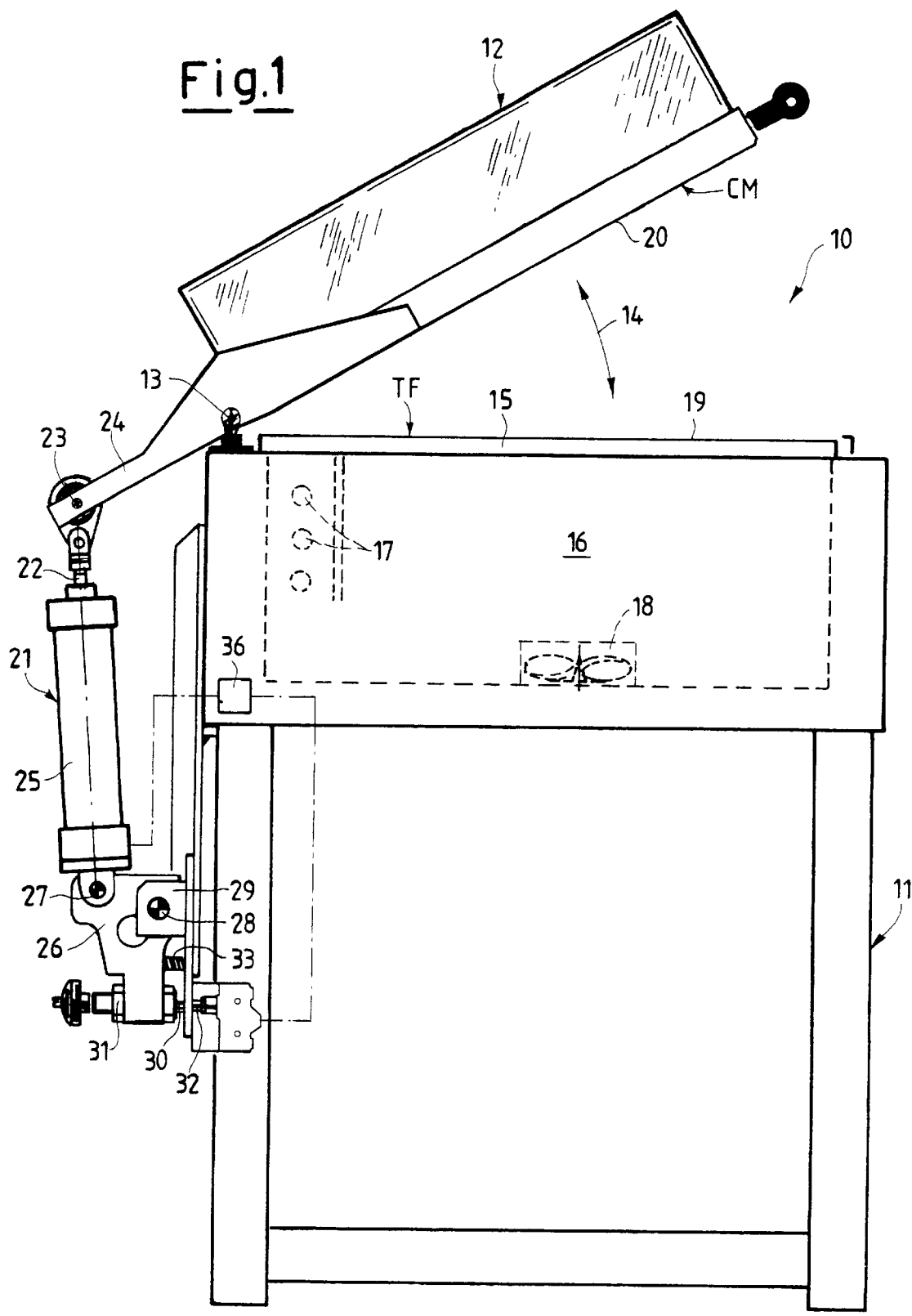

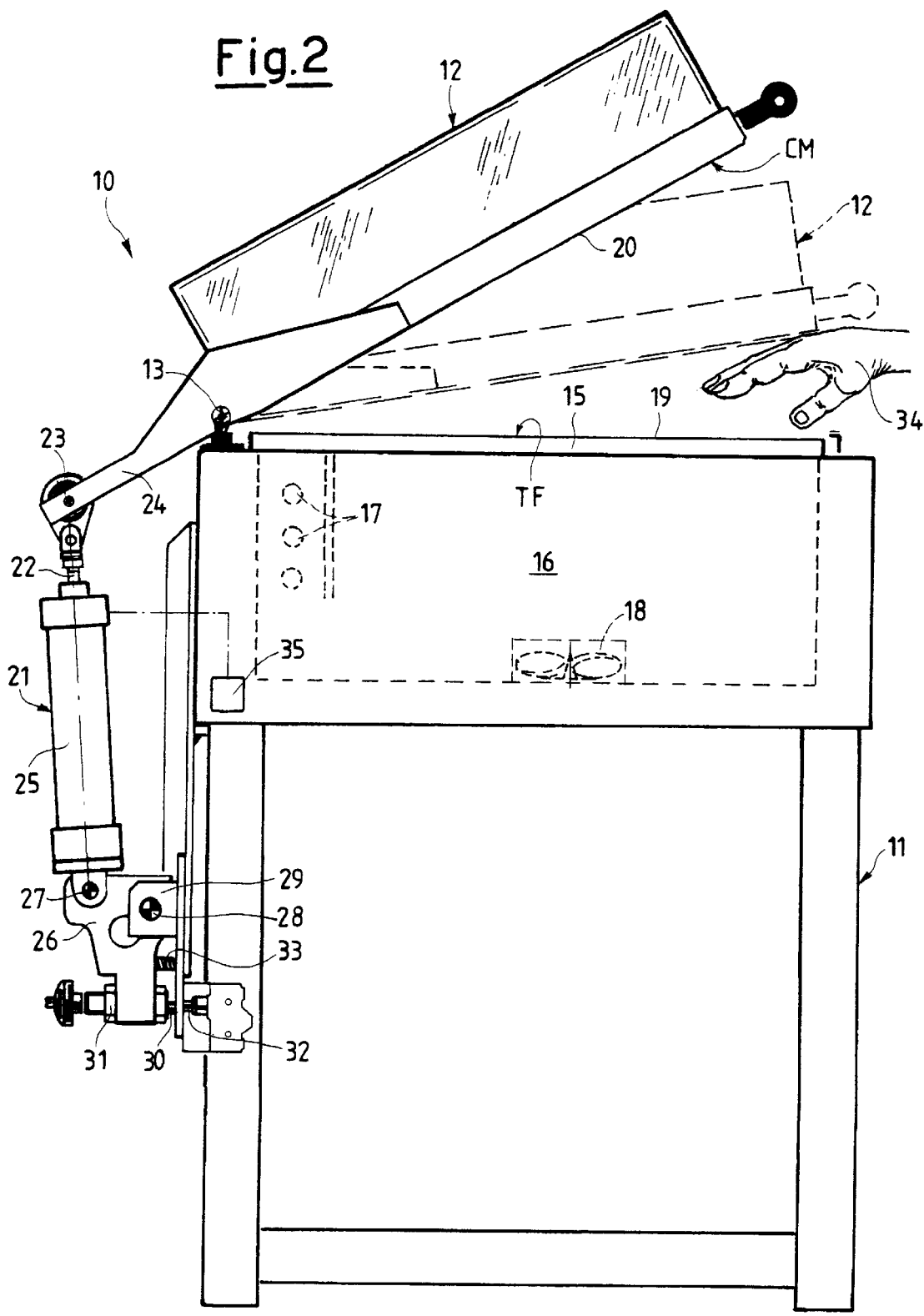

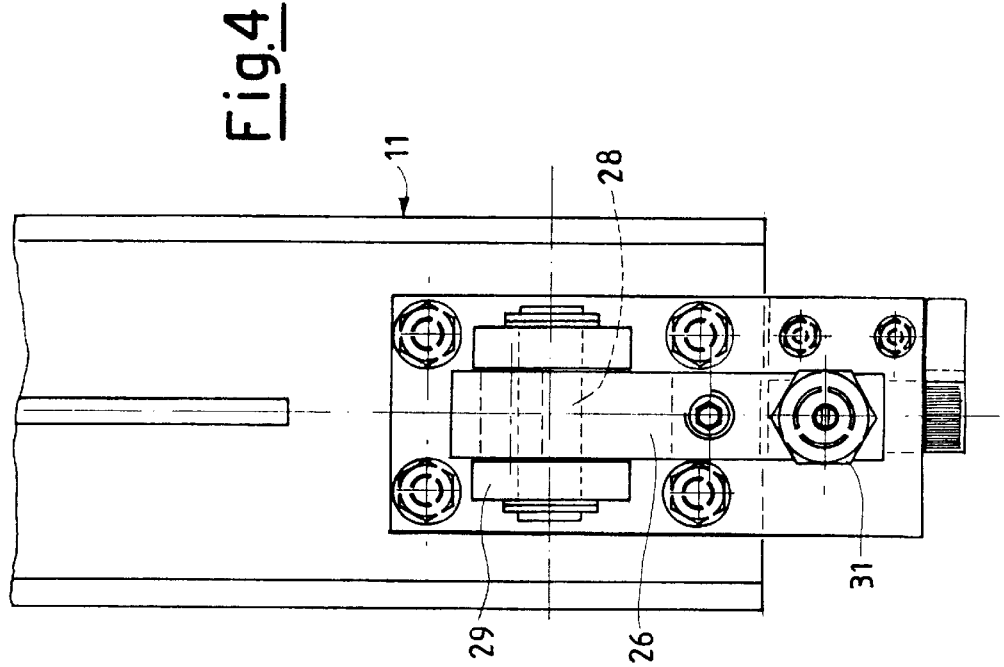
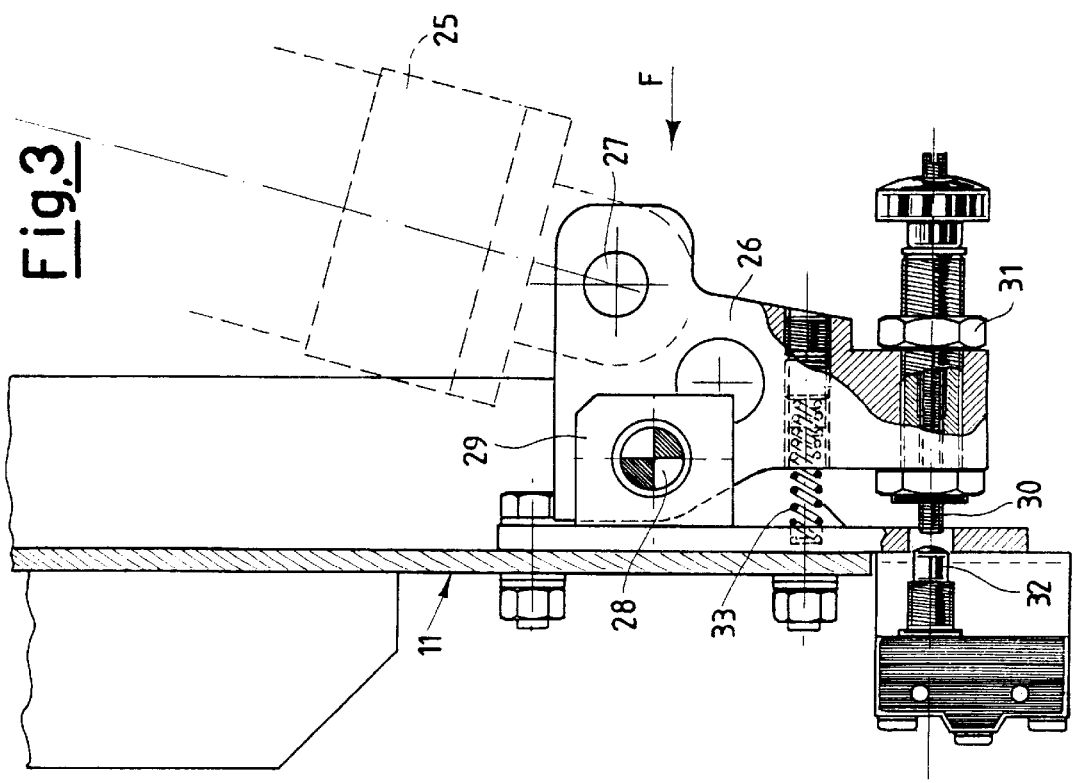

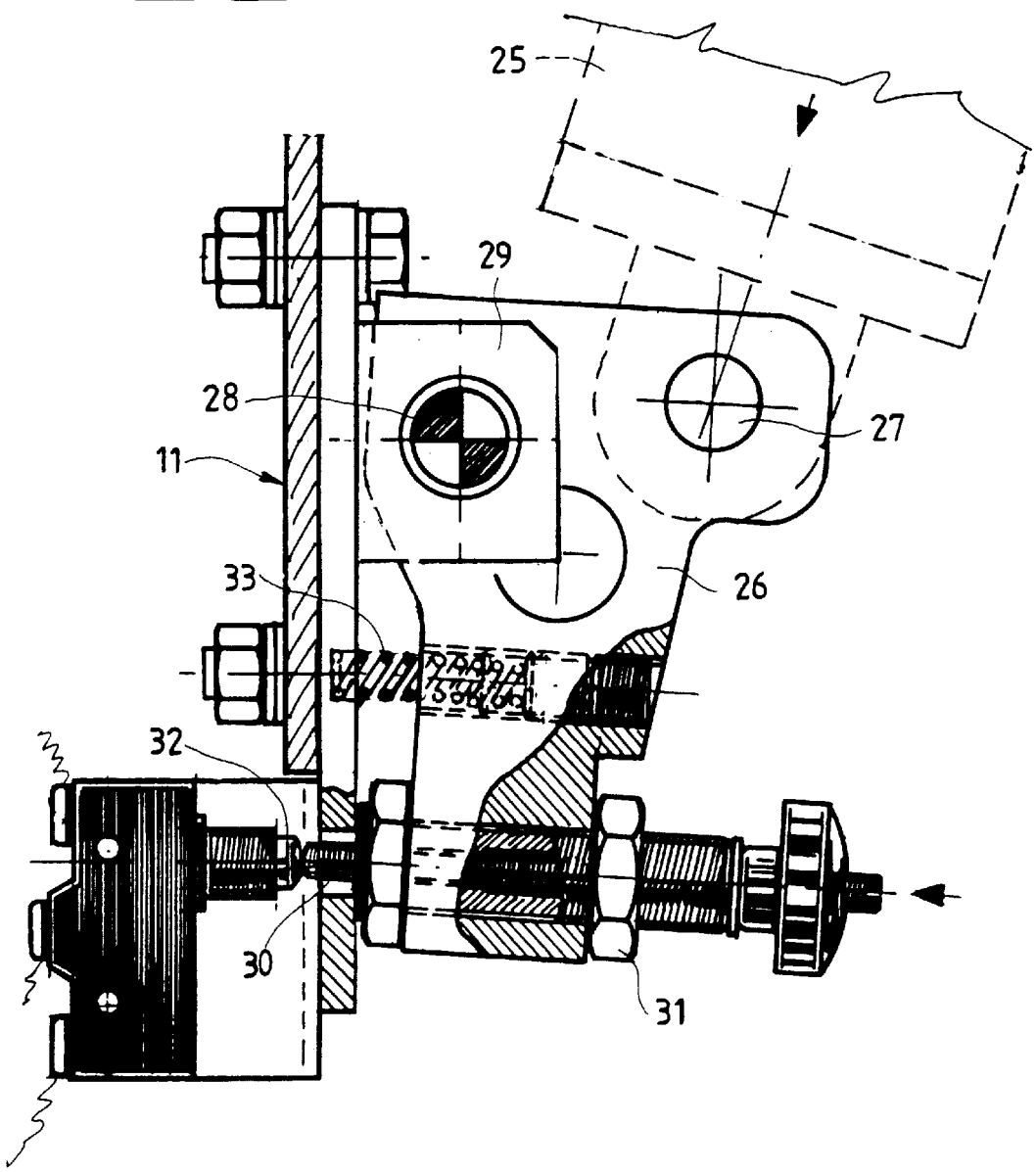

MACHINE FOR PACKAGING PRODUCTS USING A PLASTIC FILM COMPRISING A SAFETY SYSTEM AGAINST WORK ACCIDENTS

The present application claims the priority of Italian Application Serial No. MI98 A 000644.

BACKGROUND OF THE INVENTION

The present invention refers to a machine for packaging products of various type with a plastic film, said machine comprises a typical safety system against the work accidents.

According to the invention, the safety system can be applied to packaging machines of different type, both in the case of simple welding machines and in the case of thermal welding machines: wherein the first type comprises just one frame and counter-frame to cut and weld the film around the product to be packaged, meanwhile the second type comprises also a thermal shrinkage chamber associated with said frame and counter-frame to cut and weld the film.

These last machines are usually called "bell" machines, and one of them is, for instance, described and illustrated in the U.S. Pat. No. 4,104,848 which will be the reference for any further clarification.

Shortly, the "bell" packaging machines of the U.S. Pat. No. 4,104,848 has a structure formed by a chamber which, in the upper portion, is closed by means of a mobile, usually transparent bell, overlapping a welding frame. A counter frame is mounted at the base of the "bell".

Inside the chamber, both the packaging process and the thermal shrinkage process (when needed) of the single layer plastic film, containing the product to be packaged, are carried out thanks to the forced circulation of air which is heated by proper heating means.

This machine uses a so called single layer film, wherein the product to be packaged is positioned using a work plane placed laterally to the packaging chamber. The product, partially wrapped in the single layer film, is carried from said work plane to a net or grid support plane, positioned inside the chamber, and the bell is lowered in order to activate the welding blades which close the open sides of the film. Simultaneously, when it is time for the thermal shrinkage, hot air is circulated so as to cause the shrinkage of said film on the product.

In order to pick up the finished package, the operator lifts the bell so as to gain access to the support grid whereon the packaged product lays.

In "bell" machines of the above described type, as well as in simple welding machines with a frame and a counter-frame, as well as in "skin" machines (also provided with a frame and a counter frame), it is known the use to mechanise the bell movement (or of the counter-frame), in order to decrease the operator's physical exertion and to increase the machine productivity. This happens especially in the case of large dimension machines, wherein the "bell" (or the counter-frame) movement would require, during the entire day, a high consumption of energy, considering also that large dimension machines can practically work continuously to reach the desired productivity.

In order to mechanise the counter-frame or the "bell" movement, it is generally used one or more fluid dynamic actuators (pneumatic or hydraulic), which operate between the counter-frame or the "bell", and the frame of the machine.

Therefore, the opening and the closing operations of the counter-frame are automatically carried out, according to an operating cycle, wherein the time can be predefined according to the type of product to be packaged, or according to the hourly productivity to be reached, or according to the skill and to the speed of the machine operator.

It is evident that, when the counter-frame or the "bell" is closed, the operator may still have the hands, and even part of the arms, within the space comprised between the cut and welding blades and the counter-blades (or between the frame and the counter-frame in the case of a "skin" machine), with the clear danger of even serious work accidents. This in consideration also of the fact that the fluid dynamic actuator works at a constant, relatively high pressure in order to grant the cutting and the welding operations of the film.

The known safety systems are complex and therefore expensive.

The general purpose of the present invention is to overcome the above mentioned disadvantage of the known art, through the realisation of a packaging machine provided with a reliable safety system against work accidents, and said system having also an affordable cost.

BRIEF DESCRIPTION OF THE INVENTION

The above purpose is achieved by a machine which has the characteristics disclosed in the attached claims. The structural and functional characteristics of the invention and its advantages with respect to the known art will become more understandable from the analysis of the following description, which refers to the attached schematic drawings, which show an example of the embodiment of the present invention. In the drawings:

FIG. 1 is a side elevation view which shows, only as a non limiting example, a "bell" packaging machine at rest (lifted bell), which includes the safety system of the invention;

FIG. 2 shows a view as in FIG. 1, wherein the dotted lines indicate the working phase of lowering the "bell", during said phase the operator has one hand within the space comprised between said "bell" and the cutting and welding frame below;

FIG. 3 is an enlarged detail, partly in view and partly in section, which shows the safety system of the invention at rest;

FIG. 4 is an elevation view according to arrow F of FIG. 3; and

FIG. 5 is a view as in FIG. 3, wherein the safety system is in its working condition, i.e. said system causes the immediate lifting of the "bell" to its rest position.

DETAILED DESCRIPTION

The drawings show, as a non limiting example, a packaging machine of the "bell" type which comprises a safety system according to the invention. It is clear that the safety system according to the invention can be applied as well also to packaging machines formed simply by a frame TF and by a counter-frame CM for cutting and welding a plastic film around any product to be packaged (simple welding machine), or to a "skin" machine simply provided with a frame and a counter-frame, wherein the film is thermoformed and sucked on the product, which is positioned for example on a cardboard.

With reference to the drawings, said machine is indicated by the numeral 10 and has a structure formed by a supporting frame 11 with a transparent "bell" 12 on top. Said "bell" 12 is pivoted to the frame 11 in 13, and can be rotated in the direction of arrow 14, so as that it can be lowered and lifted with respect to a work plane 15. The plane 15 is positioned above the chamber 16 containing a system for the heating and for the forced circulation of air, said system is formed by resistors 17 and by at least one fan 18.

The machine 10 is completed by a fixed frame TF and by a mobile counter-frame CM respectively comprising the blades 19 and the counter-blades 20 to cut and weld the plastic film, said blades and counter-blades are mounted respectively at the top of the chamber 16 and at the base of the "bell" 12. The blades 19, 20 form what is usually called the welding frame (and counter-frame).

The oscillation of the "bell" 12 around pivot point 13, between the lifted position at rest of FIG. 1 and the lowered working position of FIG. 2, is controlled through at least one fluid dynamic actuator 21 which exerts its action between the "bell" 12 and the frame 11.

More precisely, the fluid dynamic actuator 21, for instance of the pneumatic type, has its stem 22 pivoted in 23 to an extension 24 integral with the base of the "bell" 12, and the cylinder 25 is connected, at the end opposite to 23, to the frame 11, through a link 26.

As can be clearly seen from the details of FIGS. 3–5, according to the present invention, said link 26 is pivoted around a first axis 27 to the end of the cylinder 25, and around a second axis 28 to a fork 29 integral with the frame 11.

Always according to the present invention, the link 26 further comprises a push rod 30, with the position adjustable by means of a screw knob 31, suitable to control a microswitch 32, in order to immediately stop the operating cycle of the machine, as will be explained hereinafter.

The oscillation of the link 26 around the pivot 28 is opposed by a counteracting spring 33, which exerts its action between the link 26 and the frame 11.

It is clear how the machine works, according to the invention, from the above description with reference to the figures, and, shortly, it is as follows.

As is well known to the experts in this field, the operating cycle of a "bell" packaging machine, as the one previously described, can be automatically performed, thanks to the fluid dynamic actuator 21, which controls the lowering and the lifting of the "bell" 12, which rotates around 13, along the direction of the arrow 14.

According to a further characteristic of the present invention, the lowering of the "bell" 12 is carried out under low pressure, with a slow movement, whereby said lowering can be stopped with a minimum effort, for instance by the same operator having one hand 34 positioned within the space between the blade 19 and the counter-blade 20, as shown in FIG. 2 of the drawings, and without any possibility of work accidents.

In fact, if the operating cycle, as in this case, has not been completed after a predefined time, the cycle is automatically inverted, thus causing the automatic lifting of the "bell" 12 to the position of FIG. 1.

This is obtained by putting inside the machine control system a cycle timing and cycle reversal circuit 35.

Additionally, always according to the invention, when an obstacle, as for instance the above said hand 34, stops the lowering of the "bell" 12, through the reaction of the cylinder 25, the link 26 will be forced to rotate around 28 in the clockwise direction, from the rest position of FIG. 3 to the working position of FIG. 5, wherein the push rod 30 activates the microswitch in order to immediately return, through a circuit schematised by 36, the "bell" to the lifted safety position.

This safety system is an additional system with respect to the slow lowering of the "bell" 12 under low pressure, with the possibility to stop the movement of the "bell" with a minimum effort so as to stop the working cycle for a time longer than the predefined one, thus causing—as foreseen—the intervention of the timing circuit 35, in order to return the "bell" 12 to lifted safety position of FIG. 1.

Therefore the purpose mentioned in the description preamble has been reached.

The content of the invention is defined by the following claims.

What is claimed is:

1. A machine for packaging products using a plastic film comprises: at least a fixed frame (TF) and at least a mobile counter-frame (CM), said counter-frame can be moved between a lifted rest position and a lowered working position wherein the film is clamped against said frame (TF), the movement of the mobile counter-frame (CM) is controlled by at least a fluid-dynamic actuator (25) which is connected to the end of an extension (24) of said counter frame (CM) which is integral with a bell (12), said extension being connected at its mid-point to a machine frame (11) at a pivot point (13) wherein a link (26) positioned between said actuator (25) and said machine frame (11), said link being pivoted to the actuator (21) around a first axis (27) and also being pivoted to the frame (11) around a second axis (28), said link (26) being further provided with a control means (30) connected to a microswitch (32), in order to automatically stop the machine from working.

2. A machine as claimed in claim 1, wherein said fixed frame (TF) is provided with blades (19) for cutting and welding the film, and that said mobile counter-frame (CM) is provided with counter-blades (20).

3. A machine as claimed in claim 1, wherein said control means comprises a push rod (30) and connected to a microswitch (32).

4. A machine as claimed in claim 3, wherein said microswitch (32) is operatively connected to a timing and machine cycle reversal circuit.

5. A machine for packaging products using a plastic film said machine comprising: at least a fixed frame (TF) provided with blades (19) to cut and weld the film and having a mobile counter-frame provided with counter-blades (20), which are therefore activated, the movement of the counter-frame (CM) being driven by at least one fluid dynamic actuator (25) connected to the end of an extension (24) of said counter frame (CM) which is integral with a bell (12), said extension being connected at its mid-point to a machine frame (11) wherein said counter-frame (CM) is first subjected, through said fluid dynamic actuator (21) to contact the blades (19) of the fixed frame (TF), and then to a higher pressure in order to perform the cutting and the welding operation on the film, and having a timing circuit (35) which, if the operating cycle of the machine is not completed by a predefined time, reverses said cycle and automatically returns a bell (12) to the lifted rest position.

* * * * *